Patented July 23, 1935

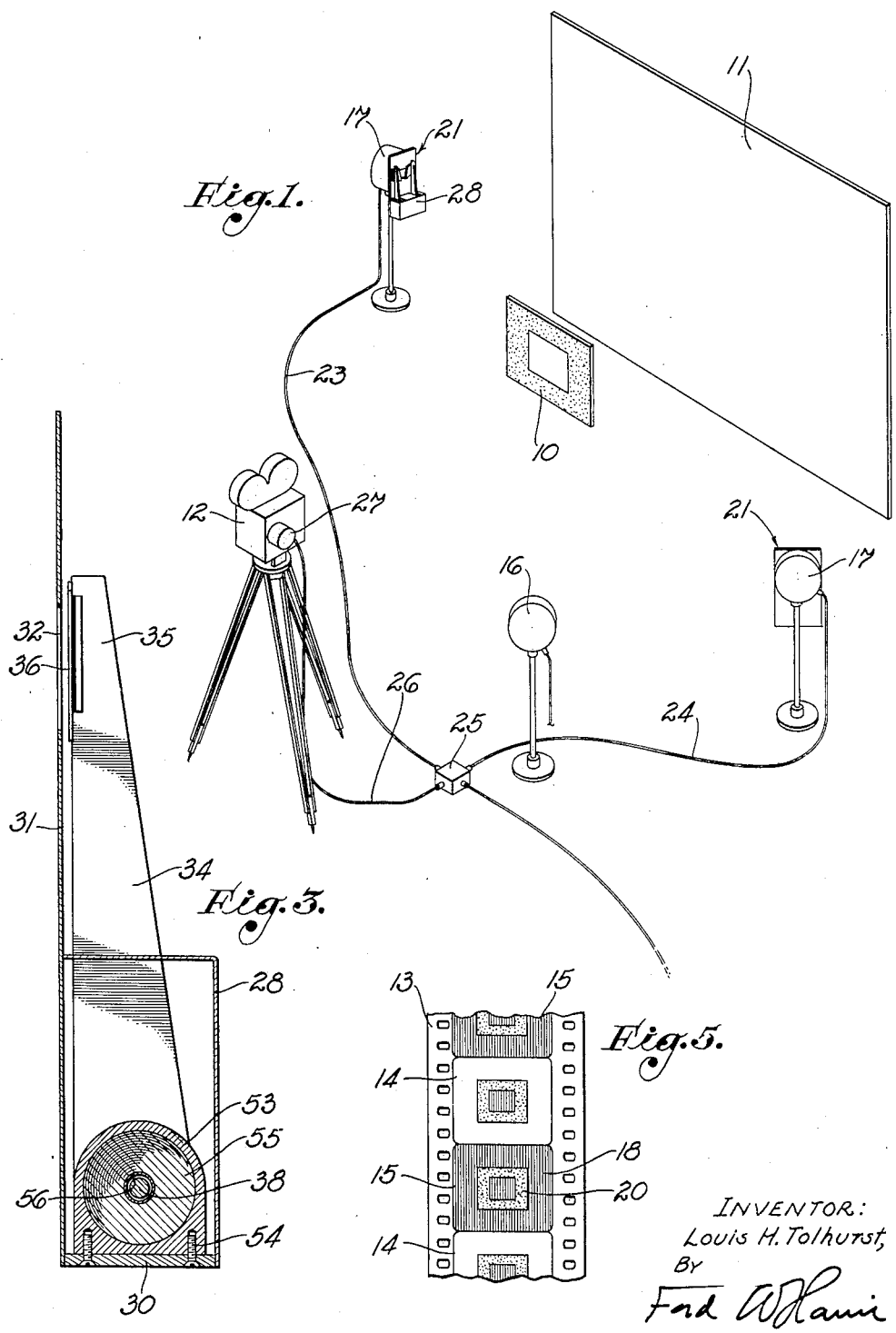

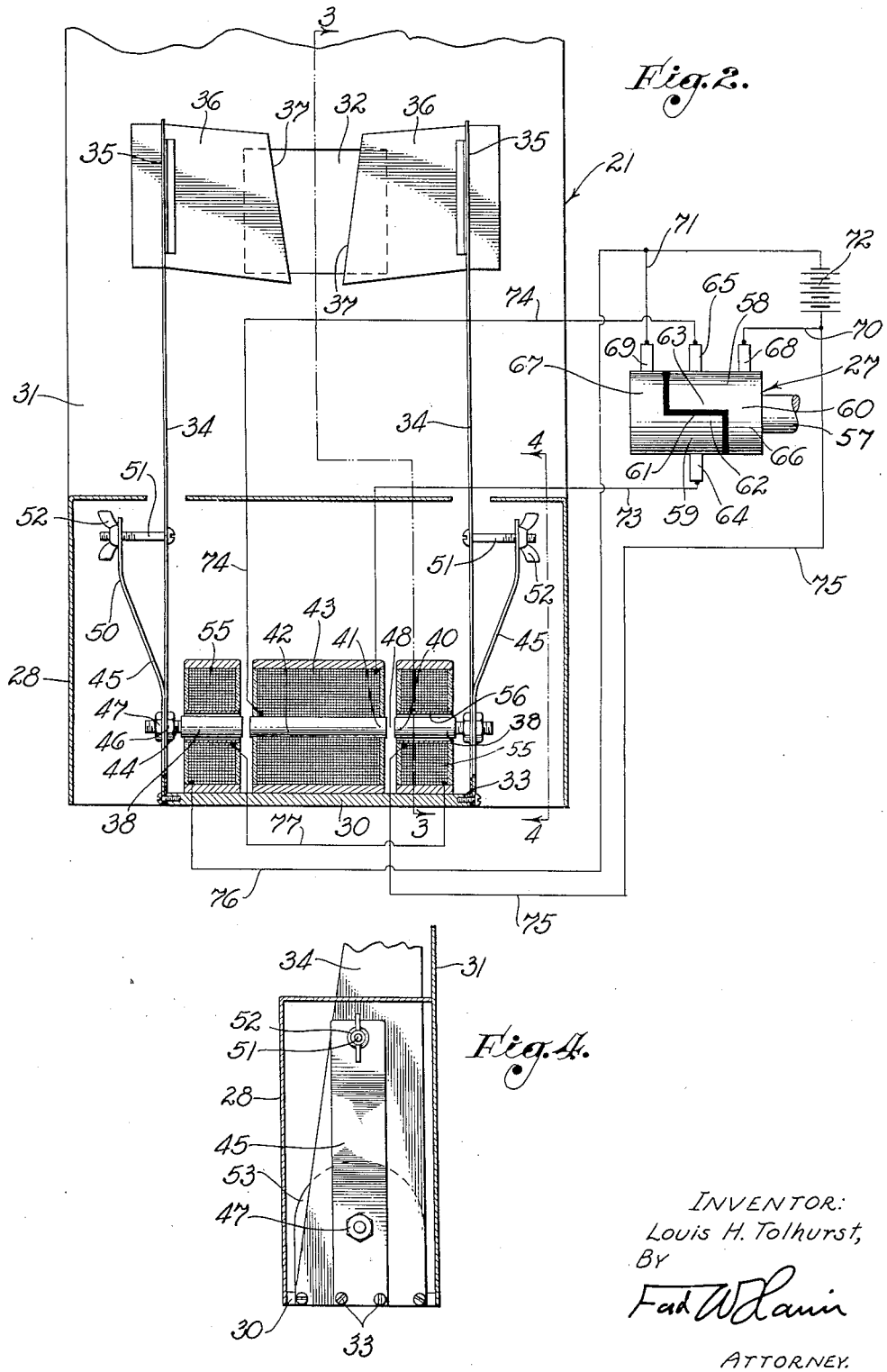

2,008,938

UNITED STATES PATENT OFFICE 2,008,938

SYNCHRONIZED SHUTTER MECHANISM

Louis H. Tolhurst, Los Angeles, Calif., assignor of one-third to Kenneth Peach and one-third to Hal E. Roach, both of Culver City, Calif.

Application May 6, 1933, Serial No. 669,713

12 Claims. (Cl. 240—1.3)

My invention relates to a light controlling means, and relates in particular to a light controlling system of especial value in the taking of motion pictures.

Since my invention at present has its principal utility in the preparation of negatives and mask negatives for use in a process of composite motion picture photography, I shall hereinafter describe my invention in such form. The method of composite photography to which I refer is for the purpose of applying to a previously taken motion picture, which may be termed a background, one or more additional images, or foreground. In the preferred practice of this method, the foreground subject, such as a setting or scene with actors, is placed before a white screen, and strong lights are placed so as to eliminate the screen during the exposure of alternative negative frames of a film in a camera which has its film advancing mechanism changed over so as to operate at double the normal speed. Accordingly, each alternate frame of the negative thus exposed receives strong light which passes forwardly from the screen and around the foreground subject. The intermediate or second alternate frames of the film are exposed to light from the foreground subject, and when developed constitute a motion picture negative of the foreground subject. The practice of this composite photography method requires, therefore, that during the exposure of one frame of the film in the camera the background screen must be strongly lighted, and during the exposure of the next frame of the film the background screen must be entirely dark so that this second frame will be exposed only to light from the foreground subject. Owing to the fact that in most instances the background screen must be quite large, it is necessary to employ a plurality of arc lights for illumination of the same, and it is necessary that the turning on and off of all of these arc lights must be accurately timed, and kept so timed, to correspond to the frequency of the exposure of the film frames in the motion picture camera.

It is an object of my invention to provide a lighting system and a control therefor by which one light or a plurality of lights may be controlled in timed relation to the movement of a film through a motion picture camera, to illuminate and darken the background screen alternately as alternate frames of the film are exposed.

It is an object of the invention to provide a simple form of shutter mechanism especially adapted for use in connection with a plurality of other similar mechanisms, and being so constructed as to maintain a perfect on-and-off control of lights directed to a specified zone of utility.

It is a further object of the invention to provide a shutter mechanism having shutter means which is swingably mounted and the parts of which are so proportioned and constructed that a specified resonance or periodicity is produced in the swinging movement of the shutter means, this resonance or periodicity corresponding to the periodicity of the advance of film frames relative to the aperture of the camera.

It is a further object of the invention to provide a light control system having shutter means which are electrically actuated and are controlled by connection with an operating part of the motion picture camera.

It is a further object of the invention to provide a light control system of the above character in which the actuation of the shutter means requires a minimum flow of electric current, and which is essentially noiseless in its operation.

It is a further object of the invention to provide a simple form of electrically actuated shutter means in which the shutter plates are mounted on leaf springs which are constructed so as to have a specified resonance, and an actuating means for such shutter means employing a polarized magnetic field and an alternating magnetic field, together with a means for producing such alternating field in timed relation to the resonance of the shutter means.

Further objects and advantages of the invention will be made evident throughout the following part of the specification.

Referring to the drawings, which are for illustrative purposes only,

Fig. 1 is a perspective view showing an embodiment of my lighting system.

Fig. 2 is a partly sectioned face view of one of the shutter mechanisms employed in the lighting system.

Fig. 3 is a sectional view taken as indicated by the line 3—3 of Fig. 2.

Fig. 4 is a fragmentary view taken as indicated by the line 4—4 of Fig. 2.

Fig. 5 is a view of a portion of a film produced by the use of my lighting system.

In Fig. 1 I show my lighting system employed in conjunction with a foreground subject 10, a background screen 11, and a motion picture camera 12, all respectively placed for the purpose of producing a motion picture film having thereon a negative of the foreground subject 10 and a background mask negative complementary to the foreground negative.

In Fig. 5 I show a portion of a negative film 13 which has been produced in the camera 12, this negative 13 having a plurality of frames 14 and a plurality of alternate frames 15. During the exposing of the frames 14 in the camera 12, there is no light upon the screen 11; therefore, the background of the foreground subject 10 is dark, and the film frames 14 are exposed to light which is reflected forwardly to the camera 12 from the foreground subject 10, such light being produced by light means 16, Fig. 1, placed to the side of the foreground subject 10 in a position to satisfactorily illuminate the same. During the exposing of the alternate frames 15, the screen 11 is strongly illuminated by light cast thereon by arc lamps 17, so that a relatively intense light is reflected forwardly from the screen and so that such intense light, which passes the foreground subject 10, will expose the area 18 around the area 20 indicating the position of or constituting the image of the foreground subject 10.

In the practice of the photographic method, it is desired to speed up the camera 12 to double the normal operating camera speed, or, in other words, so that forty-eight frames will be exposed each second, twenty-four of these frames being as shown at 14 in Fig. 5 and twenty-four of the frames being shown at 15 in Fig. 5. My lighting system includes, in conjunction with the lights 17, shutter devices 21 which are placed on the fronts of the lights 17 so as to control the emission of light rays from the lamps 17 to the screen 11 in a manner to produce non-illumination and illumination of the screen in alternate order as alternate frames 14 and 15 of the film 13 are exposed in the camera 12. The shutter devices 21 are controlled and actuated electrically through the use of cables 23 and 24 which extend to a junction box 25 and are electrically connected through a cable 26 with a control unit 27 associated with the camera 12.

In Fig. 2 I show a face view of a shutter device 21, the lower housing 28 of the device being sectioned so as to disclose the interior mechanism. The shutter device includes a supporting plate 30 which has a vertical plate 31 extending upwardly from the rearward edge thereof, this plate having an aperture 32 therein adapted to be disposed in front of the light opening of a lamp 17 when the device 21 is operatively mounted upon the front of the lamp as shown in Fig. 1.

Mounted on the ends of the supporting plate 30 by means of screws 33, are vertical spring arms 34, the upper ends 35 of which lie on opposite sides of the aperture 32 and have shutter plates 36 of light-weight metal mounted thereon in such position that when the members 34 are at rest, as shown in Fig. 2, there will be a space between the inner edges 37 of the shutter plates 36 equal substantially to one-half of the width of the aperture 32. When the shutter device is in operation, the spring arms 34 flex on opposite sides of the position in which they are shown at rest, so that the shutter plates 36 are alternately carried apart so as to disclose the entire aperture 32 and together in overlapping position of their inner edges so as to completely close the aperture 32.

Cylindrical bar armatures 38 are mounted on the spring arms 34, preferably in alignment with and extending toward each other so that the ends 40 thereof will face the ends 41 of the core 42 of a complementary or polarized magnet or coil 43. The armatures 38 have threaded shanks 44 which extend through openings in the lower parts of the spring arms 34 and through openings in auxiliary spring members 45 which are mounted on the outer faces of the lower ends of the spring arms 34. On opposite sides of the members 34 and 45, lock nuts 46 and 47 are applied to the screw shanks 44 of the armatures 38, and provide means for ready adjustment of the armatures 38 in axial direction so as to vary the gap 48 between the ends 40 of the armatures and the ends 41 of the core piece 42. The members 45 are somewhat shorter than the spring arms 34, and the upper ends thereof are bent outwardly from the faces of the spring arms 34, as shown at 50. Screws 51 are secured to the spring arms 34 in such position that they will project through openings in the upper ends of the members 45, and thumb nuts 52 are applied to the outer ends of the screws 51 in positions to bear against the upper ends of the members 45 so as to flex the members 45 inwardly toward the respective spring arms 34.

In cylindrical casings 53 mounted on the base plate 30 by means of screws 54, armature field coils 55 are mounted in positions to surround the armatures 38, there being axial openings 56 through the coils 55 through which the armatures 38 extend as shown in Fig. 2. As diagrammatically shown in Fig. 2, the control unit 27 includes a shaft 57 which may be connected to some rotating part of or associated with the camera mechanism. For example, in the general practice of the invention, it is customary to connect the shaft 57 to the motor which drives the mechanism of the camera 12. Secured to the shaft 57 is a cylindrical commutator 58 having segments 59 and 60 mounted thereon, such segments being disposed in stepped or overlapping relation as shown at 61, so that as the commutator 58 rotates, the respective overlapping portions 62 and 63 of the segments 59 and 60 will consecutively engage diametrally opposed brushes 64 and 65. The end portions 66 and 67 of the respective segments 60 and 59 are annular so as to continuously engage brushes 68 and 69. By use of conductors 70 and 71, the brushes 68 and 69 are connected to the negative and positive poles of a source of direct electric current, such as a battery 72. By use of conductors 73 and 74, the brushes 64 and 65 are connected with the supplementary field magnet 43, so that as the commutator 58 is rotated, the brushes 64, 65, 68, and 69 will cooperate with the segments 59 and 60 to reverse or alternate the flow of current through the winding of the field coil 43. The armature field coils 55 are connected in series with the battery 72 by means of conductors 75 and 76 and a conductor 77 extending between the armature field coils 55. Accordingly, the magnetic field produced around and through the armatures 38 will remain of constant polarity, whereas the magnetic field produced through the core 42 will alternate, thereby repelling and attracting alternately the magnetic fields produced by the armature field coils 55 and consequently alternately attracting and repelling the armatures 38 whereby to apply reversing or reciprocating forces to the spring arms 34 to cause them to oscillate alternately toward and away from each other so as to carry the shutter blades 36 first into positions obstructing the aperture 32 and then into positions revealing the aperture 32.

Camera motors now employed are generally of the 1440 R. P. M. synchronized type, and the film advancing mechanism is so designed as to produce an exposure of twenty-four consecutive frames per second. In the practice of my invention a 1440 R. P. M. motor may be employed, but the film advancing mechanism is then geared up to produce forty-eight consecutive exposures per second, or, in other words, twenty-four of the frames 14 of Fig. 5 and twenty-four of the frames 15. The commutator 58 is so connected to the camera mechanism or driving motor that it will rotate at a rate of 1440 R. P. M. This will result in forty-eight reversals of the electric current through the field coil 43, and accordingly the shutter blades 36 will be drawn toward each other twenty-four times and be forced apart twenty-four times, and light from the lamps 17, Fig. 1, will illuminate the screen 11 twenty-four times per second during the exposure of twenty-four of the frames 15 per second, the screen 11 being dark during the exposure of twenty-four frames 14 per second.

A further feature of the invention contributing to the simplicity of controlling a plurality of lamps in the foregoing manner resides in the constructing of the shutter means in such a manner as to have a resonance or natural periodicity corresponding to the reversals of current through the field coil 43 and to the frequency or periodicity of the film advancing movement accomplished in the camera 12 when the advancing mechanism is geared up in the manner previously described. Accordingly, the spring arms 34 are constructed of such weight and size relative to the shutter blades 36 that they will normally vibrate at a rate of 1440 complete cycles or oscillations per minute. When the members 34 are tuned to approximately the desired resonance, a minimum of electrical energy is required for the operation thereof and a perfect control of the light is accomplished.

My invention provides a tuning means for the spring arms 34, consisting of the spring blades 45 and the screws 51. For example, the natural resonance of the arms 34 may be varied by changing the flexure of the spring members 45 by turning the nuts 52 on the screws 51 so as to vary the positions of the upper ends of the spring members 45 relative to the spring arms 34. In the practice of my invention, by the use of a polarized magnetic field, such as produced by the field coils 55, and an alternating magnetic field, such as produced by the field coil 43, I am able to exert motivating forces on the spring arms 34 in both directions of movement of such spring arms, and accordingly the size of the armature and magnetic coils may be kept at a minimum, and the flow of current required for the operation of the shutter devices may be kept at a minimum.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A light controlling means of the character described for use with a light producing means, comprising a shutter for intermittently obscuring said light producing means, said shutter being adapted to swing back and forth between obscuring and non-obscuring positions relative to said light producing means; an armature connected to said shutter; armature field means for producing a magnetic field in said armature; motivating field means for producing a motivating magnetic field adjacent said armature; circuit means for feeding direct current to both of said field means; and means associated with said circuit means for periodically reversing the flow of current in one of said field means.

2. A light controlling means of the character described for use with a light producing means, comprising a shutter for intermittently obscuring said light producing means, said shutter being adapted to swing back and forth between obscuring and non-obscuring positions relative to said light producing means, and said shutter being so constructed as to have a selected resonance; an armature connected to said shutter; armature field means for producing a magnetic field in said armature; motivating field means for producing a motivating magnetic field adjacent said armature; circuit means for feeding direct current to both of said field means; and means associated with said circuit means for periodically reversing the flow of current in one of said field means in timed relation to the resonance of said shutter.

3. A shutter device of the character described, including: a support; a spring means extending from said support; a shutter plate secured to said spring means so as to swing between operative and inoperative positions as said spring means is flexed; an armature connected to said spring means; an armature field coil for said armature; a complementary field coil adjacent said armature; circuit means for feeding direct current to said coils; and means for reversing the flow of current in one of said coils in timed relation to the resonance of said spring means.

4. A shutter device of the character described, including: a member having a light aperture; a pair of shutters disposed at rest on opposite sides of and overlapping said aperture, with a space between the adjacent edges of said shutters; a pair of springs extending from said shutters in parallel relation, said springs being so constructed as to have the same resonance; a support secured to the outer ends of said springs; armatures on said springs between said support and said shutters; a polarized magnet disposed between said armatures; a field coil for each of said armatures; and means for subjecting one of said coils to an alternating current having a frequency corresponding to the resonance of said springs.

5. A shutter device of the character described, including: a support; a spring means extending from said support; a shutter plate secured to said springs means so as to swing between operative and inoperative positions as said spring means is flexed; an armature connected to said spring means; an armature field coil for said armature; a complementary field coil adjacent said armature; circuit means for feeding direct current to said coils; means for reversing the flow of current in one of said coils in timed relation to the resonance of said springs means; and adjusting means for varying the resonance of said spring means.

6. A shutter mechanism of the character described, including: a shutter adapted to swing back and forth between obscuring and non-obscuring positions, said shutter being so constructed as to have a selected resonance; an armature connected to said shutter; armature field means for producing a magnetic field in said armature; motivating field means for producing a motivating magnetic field in said armature; and means for reversing the flow of current in said motivating field means in timed relation to the resonance of said shutter.

7. A shutter mechanism of the character described, including: a shutter adapted to swing back and forth between obscuring and non-obscuring positions, said shutter being so constructed as to have a selected resonance; an armature connected to said shutter; armature field means for producing a magnetic field in said armature; motivating field means for producing a motivating magnetic field in said armature; means for reversing the flow of current in said motivating field means in timed relation to the resonance of said shutter; and adjusting means operative to vary the resonance of said shutter.

8. A shutter device of the character described, including: a support; a spring means extending from said support; a shutter plate secured to said spring means so as to swing between operative and inoperative positions as said spring means is flexed; an armature connected to said spring means; an armature field coil for said armature; a complementary field coil adjacent said armature; circuit means for feeding direct current to said coils; means for reversing the flow of current in said complementary field coil in timed relation to the resonance of said spring means; and adjusting means for varying the resonance of said spring means.

9. A shutter device of the character described, including: a support; a spring means extending from said support; a shutter plate secured to said spring means so as to swing between operative and inoperative positions as said spring means is flexed; an armature connected to said spring means; an armature field coil for said armature; a complementary field coil adjacent said armature; circuit means for feeding direct current to said coils; and means for reversing the flow of current in said complementary field coil in timed relation to the resonance of said spring means.

10. A shutter device of the character described, including: a member having a light aperture; a pair of shutters disposed at rest on opposite sides of and overlapping said aperture, with a space between the adjacent edges of said shutters; a pair of springs extending from said shutters in parallel relation, said springs being so constructed as to have the same resonance; a support secured to the outer ends of said springs; armatures on said springs between said support and said shutters; a polarized magnet disposed between said armatures; a field coil for each of said armatures; means for energizing said field coils; a complementary field coil around said polarized magnet; and means for conducting a reversing electric current through said complementary field coil in timed relation to the resonance of said springs.

11. A shutter device of the character described, including: a member having a light aperture; a pair of shutters disposed at rest on opposite sides of and overlapping said aperture, with a space between the adjacent edges of said shutters; a pair of springs extending from said shutters in parallel relation, said springs being so constructed as to have the same resonance; a support secured to the outer ends of said springs; armatures on said springs between said support and said shutters; an electromagnet disposed between said armatures; a field coil for each of said armatures; means for conducting a direct current through said field coils; and means for conducting a reversing flow of electric current through said electromagnet in timed relation to the resonance of said springs.

12. A shutter device of the character described, including: a member having a light aperture; a pair of shutters disposed at rest on opposite sides of and overlapping said aperture, with a space between the adjacent edges of said shutters; a pair of springs extending from said shutters in parallel relation, said springs being so constructed as to have the same resonance; a support secured to the outer ends of said springs; armatures on said springs between said support and said shutters; coil means for said armatures; an electromagnet disposed between said armatures, said electromagnet being provided with coil means; and means for conducting a direct current flow through one of said coil means and a reversing current flow through the other of said coil means in timed relation to the resonance of said springs.

LOUIS H. TOLHURST.